March 1, 1932.  P. HALLOT  1,847,716
BRAKE ADJUSTING MECHANISM
Original Filed Dec. 18, 1926   3 Sheets-Sheet 1
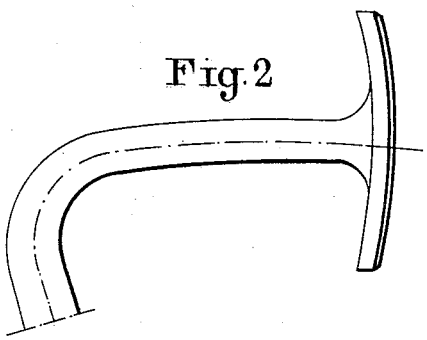
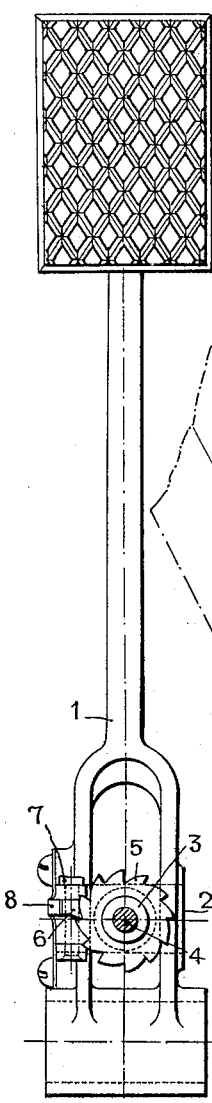
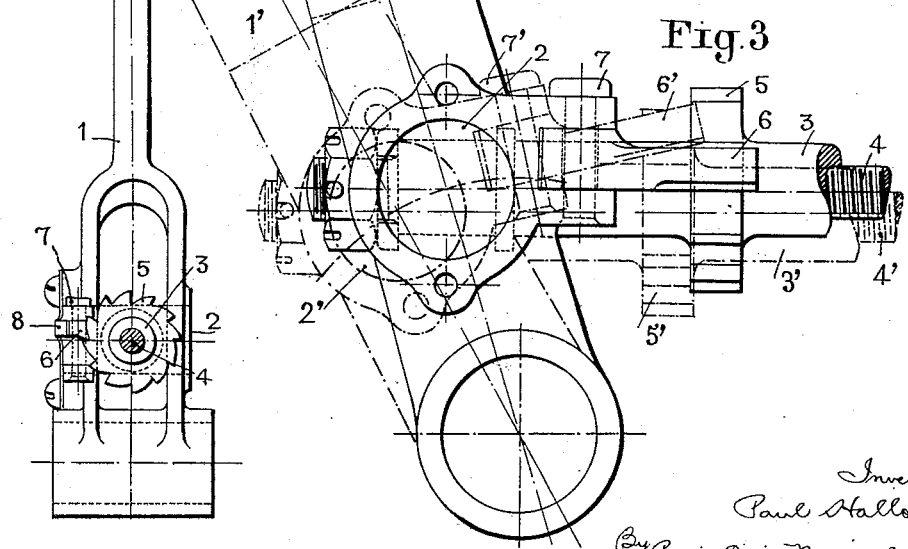

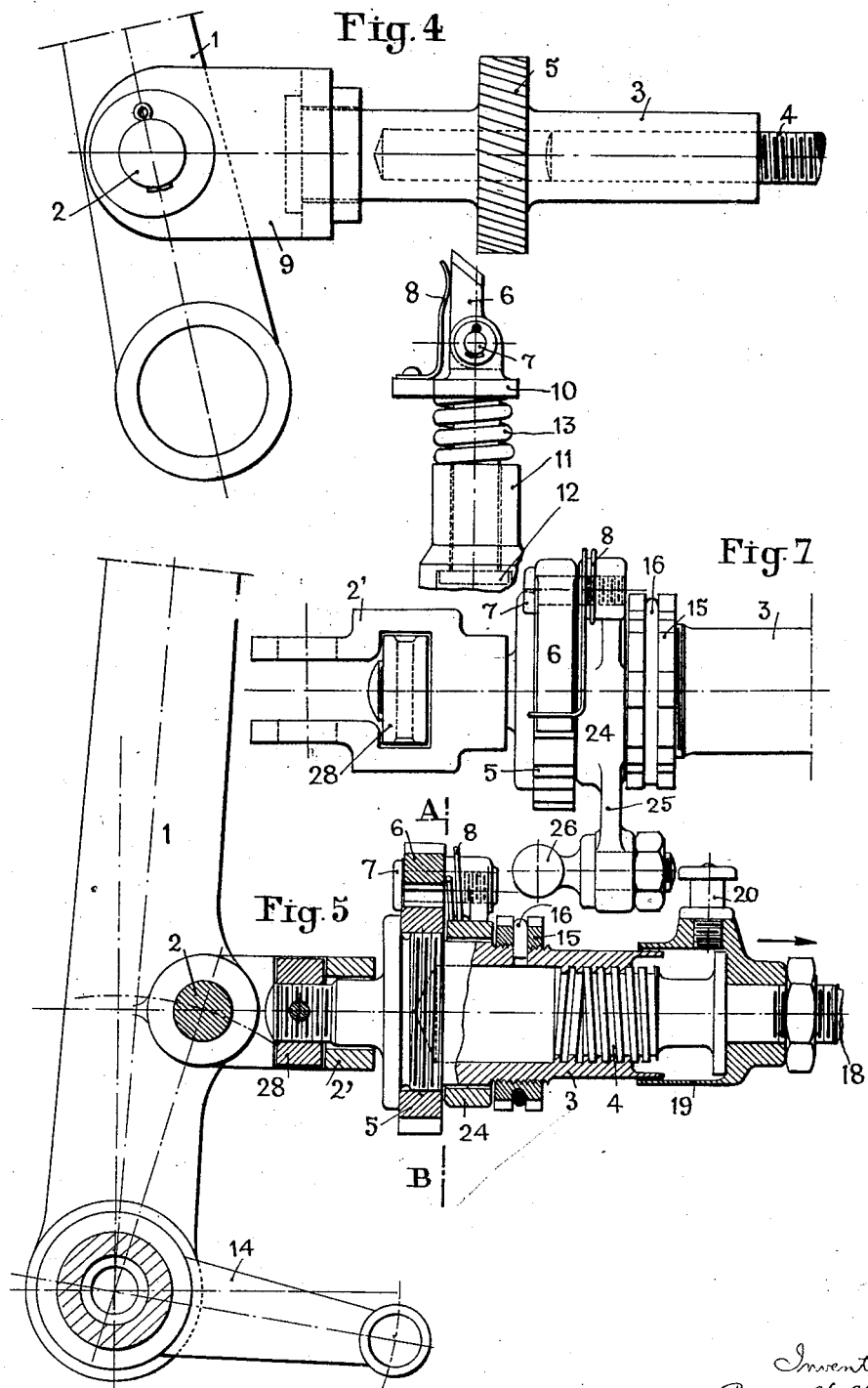

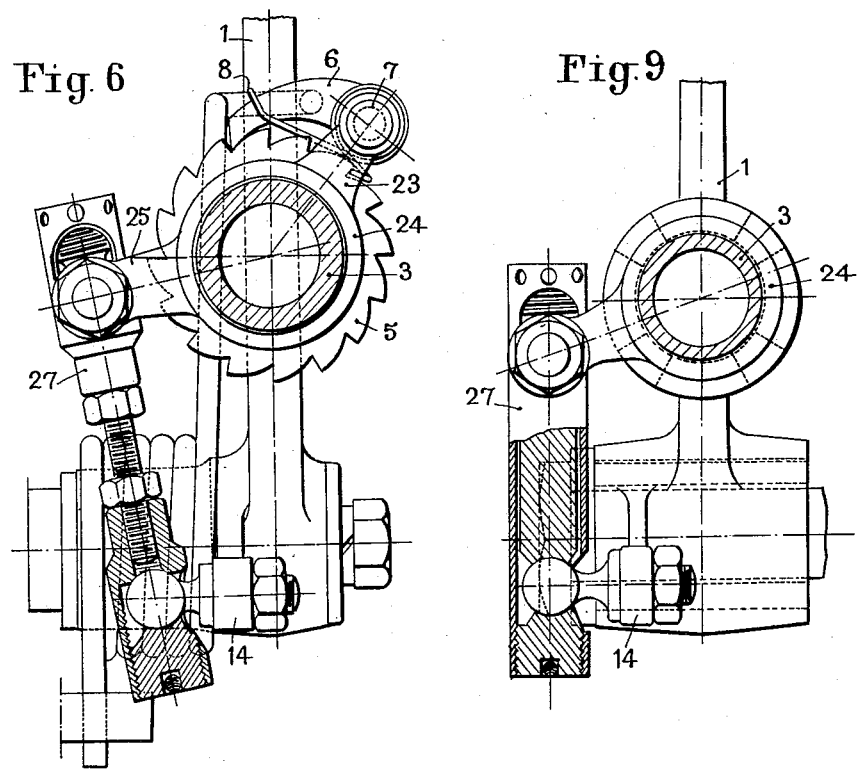
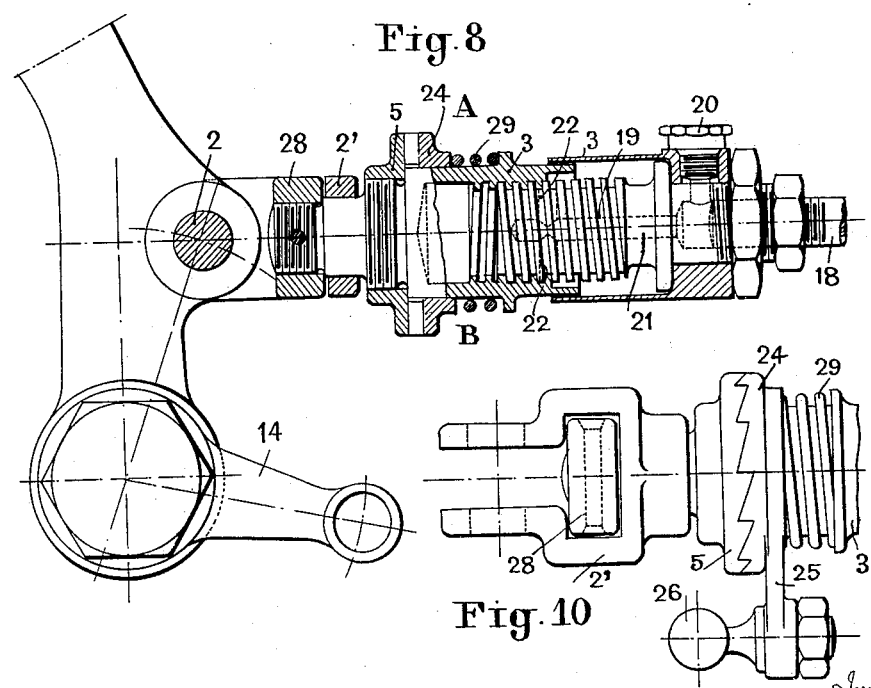

Patented Mar. 1, 1932

1,847,716

UNITED STATES PATENT OFFICE

PAUL HALLOT, OF PARIS, FRANCE

BRAKE ADJUSTING MECHANISM

Application filed December 18, 1926, Serial No. 155,739. Renewed December 16, 1931.

The present invention has for its subject brake mechanism with means for automatically taking up the free movement which is produced in the levers or pedals subjected to heavy pressure and referred to as automatic adjusting gear, in which the free movement produced by reason of bending and wear of the brake linings or of the pivots are compensated automatically.

It relates more particularly to all new applications of these improved means to pedals or levers of automobile vehicles, aircraft or other machines, either for the purpose of acting as a servo-brake or for actuating under improved conditions the brakes known as self-multiplying brakes or mechanical or vacuum fluid servo-brakes provided or not with automatic adjusting devices for preventing the jamming of the wheels.

The principles of the mechanical construction of the invention are the following.

There is preferably secured to the pedal itself or to the frame which connects it to the operating rod, a ratchet device such as a pawl or the like which effects the taking up of the free movement of the mechanism in such a manner that when the pedal passes beyond the limit position selected by the constructor, this pawl is disengaged from the tooth with which it engaged and, under the action of a suitable spring, engages the adjacent tooth of a screw threaded take-up sleeve of which the angular movement, during the releasing movement, acts on the rod of the mechanism in the direction of the shortening thereof in such a manner as to compensate all the free movements due to wear of the brake linings and all other causes.

The mechanical construction of the invention may be obtained by various means hereinafter described solely by way of example.

Figures 1 and 2 are illustrations of the complete principle of the device.

Figure 3 illustrates the system to a larger scale. In this figure the position at the moment of operation is indicated in chain dotted lines.

Figure 4 shows diagrammatically a modification of a particular arrangement of one of the members for adjustment.

Figures 5, 6 and 7, 8, 9 and 10 show two further forms of construction of the device.

In Figures 1, 2 and 3 a forked pedal 1 receives a shaft 2 through which passes the pivot of an adjusting member 3 which itself is locked on the shaft 2 by a nut. This member 3 carries a ratchet wheel 5 and is internally screw threaded for the reception of the screw threaded rod 4 connected to the brake mechanism. A pawl 6 secured by a pin 7 to the pedal 1 is held against the teeth of the ratchet wheel 5 by a spring 8.

In Figure 3 the operation will be readily seen. When the pedal has reached the limit of its angular movement, which is the position indicated in chain dotted lines, the pawl 6 passes over one tooth of the ratchet wheel 5 under the action of the spring 8 (Figures 1 and 2).

During the return movement of the pedal, the pawl 6', moves downwardly, causes the ratchet wheel 5' to turn through the distance of one tooth and this rotation causes the member 3' to screw on to the rod 4' and automatically take up the free movement due to the wear of the brake linings.

Figure 4 is a modification of the construction shown in the previous figures in that the pawl 6 is mounted independently of the pedal and is adapted to engage with a helical tooth ratchet wheel 5 mounted on the brake rod and actuate it only upon the return movement of the pedal. As shown in the figure, a sleeve 3 carrying a ratchet 5 is mounted for free rotation in the link 9 connected to the brake pedal 1. Mounted below and to one side of the ratchet 5 is the pawl 6, pivoted at 7 and restrained in a vertical position by the spring 8. In the arrangement shown, the pawl 6 is so pivoted at 7 as to be rotatable only in a counter clockwise direction.

When the brake pedal 1 is pressed forward (to the left in the figure) the ratchet 5 contacts with the pawl 6 and forces it forward against the action of the spring 8, since the pawl is rotatable in that direction. At the limit of the forward movement of the pedal the ratchet 5 will have passed over the pawl 6, which will then have snapped back into a vertical position. Then on the return movement, the ratchet again engages the pawl 6, but since it is not yieldable in the return direction the pawl will remain vertical and the upper edge thereof will engage with one of the helical teeth of the ratchet and cause the ratchet to be rotated. Adjustment of the brake rod length is therefore accomplished in the same manner as before by the rotation of the sleeve 3 on the threaded portion 4 of the brake rod.

In Figures 5, 6 and 7 the device is mounted on the head of the operating link mechanism 18 thus enabling any existing pedal to be used.

The ordinary pedal 1 is connected by the spindle 2 to a cap 2' receiving an adjusting member 3 forming a sleeve for a screw 4 connected to the rod 18 and which may have an angular movement in the cap 2' but is held in its longitudinal position by a nut 28.

On the member 3 is screwed a ratchet wheel 5 with which is adapted to co-operate a pawl 6 held in engagement therewith by a spring 8, the pawl being mounted on a pivot 7 carried in an arm 23 connected to a movable member 24 of which the other arm 25 is provided with a spherical portion 26 (Figure 7) connected by a link connection 27 to a lever 14 secured to the pedal 1 (Figure 6).

The movable member 24 is prevented from longitudinal movement on the member 3 by a nut 15 which itself is locked by a brake 16. The screw 4 connected to the rod 18 can move in the interior of the sleeve 3 and it is mounted in such a manner that it cannot turn about its axis. The screw 4 is provided with a dust cap 19 provided with a lubricating cup 20 and may be provided with the improved devices 21 and 22 shown in Figures 8, 9 and 10.

The operation is as follows:—

When pressure is applied to the pedal 1 the screw and nut device is moved to the left (Figure 5), its position varying very little in relation to its initial axis.

The lever 14 being moved from the bottom upwards transmits by the member 27 to the arm 25 and consequently to the movable member 24 an angular movement about the member 3. The pawl 6 therefore tends, under the action of rotation, to move over a tooth of the ratchet wheel 5 and it passes over this when the angle described by the pedal 1 has reached a predetermined amount, the braking taking place as with the usual rod mechanism.

When the pedal 1 returns to its position of rest the lever 14 in moving downwardly consequently causes the movable member 24 and the pawl 6 to turn the sleeve 3 in the opposite direction so that this screws with an amount corresponding with one tooth on the screw 4 which is secured to the rod 18 which consequently effects automatically in the whole rod mechanism a taking up corresponding to the various free movements which have caused the disengagement of the pawl 6.

It is therefore not necessary to consider in the assemblage of the rods the movements of the pedal which are produced by the free movements thus eliminating the necessity of frequent adjustments. In this manner the useful movement of the pedal becomes greater and it is possible to amplify the relative reduction of the rods, produced by the same effort of the pedal, thus obtaining greater braking efforts on each of the wheels.

The advantages of the improvement are as follows:—

1. Eliminating the necessity of adjusting the brakes.

2. Rendering the driving of a vehicle more satisfactory by reason of the fact that a smaller muscular effort must be exerted by the driver for obtaining braking.

Figures 8, 9 and 10 show a modified and simplified form of construction reducing the number of parts, in which the corresponding members are referred to by the same references and of which the operation is the same.

The stationary ratchet wheel 5 is cut away on one lateral face and engages directly with the movable member 24 of which the adjacent face is arranged in the form of a movable ratchet 24, the whole being held in the engaged position by a spring 29.

Another feature of this device (Figures 8, 9 and 10) applicable to those of the other figures by way of improvement is that of lubrication. The lubricator 20 communicates with a central passage 21 in the screw 4 and two holes 22 enable the oil or the grease to pass directly into the screw threads of the screw 4 and of the member 3.

Although these improved devices have been constructed more particularly for application to the pedals of motor cars it will be understood that they may also be used in their complete combinations and for all types of operating mechanism liable to extension by reason of wear or other causes (hand lever for motor cars or for operating the members of any other engine such as the braking of trains, landing of aeroplanes in order to enable these latter to be braked under the most satisfactory conditions, etc.).

The realization of the said apparatus may be obtained by any means other than those given by way of example, their principle of operation consisting essentially in effecting the taking up of free movement only from the moment at which predetermined and limited positions of the pedal are exceeded and during return movement of the said pedal only, the pivot of the pawl or of the take up device being capable of being disposed in a movable or variable position, that is to say either directly upon the pedal itself or upon the cap of the rod mechanism, or upon an independent support, preferably constituting an elastic shock absorber for the pawl engagement.

For this reason the methods of construction of the invention are not limited in any respect to the arrangements described which have only been given by way of example so as to facilitate the understanding of the principles of operation. The device may therefore be provided with a toothed pinion, or a plate or a sector having helical teeth, with any means provided for the purpose of obtaining the same results of adjustment by any ratchet members assembled by means of teeth or inclined planes.

In particular there is claimed essentially as forming part of the invention all modifications and variations of action which produce by means of any suitable details or agencies these industrial advances principally applicable in the motor car industries.

Having thus described my invention what I claim as new and desire to secure by Letters Patent is:—

1. A device of the character described comprising a brake lever adapted to oscillate about a fixed pivotal point, a member pivoted to said lever at a point distant from said pivotal point, a sleeve connected to said member and freely rotatable therein, a brake rod screw-threaded in said sleeve and extending in a lateral plane from said lever, a ratchet rigidly mounted on said sleeve, and a member loosely collared on said sleeve and adapted to actuate said ratchet and rotate said sleeve when said lever is moved more than a predetermined amount.

2. A device of the character described comprising a brake lever adapted to oscillate about a fixed pivotal point, a member pivoted to said lever at a point distant from said pivotal point, a sleeve socketed in said member and freely rotatable therein but restrained against longitudinal movement with respect thereto, a brake rod screw-threaded in said sleeve and extending in a lateral plane from said lever, a ratchet rigidly mounted on said sleeve, and a member operatively connected to said lever and engaging said ratchet and adapted to rotate said sleeve when said lever is moved more than a predetermined amount.

3. A device of the character described comprising a brake lever adapted to be oscillated about a fixed pivotal point, a member pivoted to said lever at a point distant from said pivotal point, a sleeve socketed in said member and freely rotatable therein but restrained against longitudinal movement with respect thereto, a brake rod screw-threaded, in said sleeve and extending in a lateral plane from said lever, a ratchet rigidly mounted on said sleeve, and a spring pressed ratchet engaging member controlled by the operation of said lever and adapted to actuate said ratchet and rotate said sleeve when said lever is moved more than a predetermined amount.

4. A device of the character described comprising a brake lever adapted to be oscillated about a fixed pivotal point, a member pivoted to said lever at a point distant from said pivotal point, a sleeve socketed in said member and freely rotatable therein, a brake rod screw-threaded in said sleeve and extending in a lateral plane from said lever, a ratchet rigidly mounted on said sleeve, and a spring pressed member loosely collared on said sleeve and adapted to actuate said ratchet and rotate said sleeve when said lever is moved more than a predetermined amount.

5. A device of the character described comprising a brake lever adapted to be oscillated about a fixed point, a crank arm adapted to be oscillated about said point when said lever is actuated, a member pivoted to said lever, a sleeve socketed in said member and freely rotatable therein, a brake rod screw-threaded in said sleeve, a ratchet rigidly mounted on said sleeve, and a member connected to said crank arm and engaging said ratchet and adapted to rotate said sleeve when said lever is moved more than a predetermined amount.

6. A device of the character described comprising a brake lever adapted to oscillate about a fixed pivotal point, a member pivoted to said lever at a point distant from said pivotal point, a sleeve socketed in said member and freely rotatable therein, a brake rod screw threaded in said sleeve and extending in a lateral plane from said lever, a ratchet rigidly mounted on said sleeve, and a member loosely collared on said sleeve and operatively connected to said lever, said member being adapted to actuate said ratchet and rotate said sleeve when said lever is moved more than a predetermined amount.

In witness whereof, I have hereunto set my hand this 30th day of November, 1926.

PAUL HALLOT.